US008866939B2

(12) United States Patent
Miyashita et al.

(10) Patent No.: US 8,866,939 B2
(45) Date of Patent: Oct. 21, 2014

(54) BLACK LEVEL ADJUSTMENT CONTROL DEVICE AND SOLID-STATE IMAGING DEVICE

(75) Inventors: Yuji Miyashita, Kanagawa (JP); Kazuhide Sugiura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 13/556,621

(22) Filed: Jul. 24, 2012

(65) Prior Publication Data

US 2013/0188075 A1 Jul. 25, 2013

(30) Foreign Application Priority Data

Jul. 26, 2011 (JP) .................. 2011-163476

(51) Int. Cl.
*H04N 9/64* (2006.01)
*H04N 5/335* (2011.01)
*H04N 5/361* (2011.01)

(52) U.S. Cl.
CPC ............... *H04N 5/335* (2013.01); *H04N 5/361* (2013.01)
USPC .......................................... 348/243; 358/529

(58) Field of Classification Search
CPC ... H04N 5/2176; H04N 5/2178; H04N 5/361; H04N 5/16; H04N 5/165; H04N 5/18; H04N 5/185
See application file for complete search history.

(56) References Cited

U.S. PATENT DOCUMENTS

| 2006/0012698 A1* | 1/2006 | Nitta et al. ..................... 348/308 |
| 2007/0085917 A1* | 4/2007 | Kobayashi ..................... 348/241 |
| 2009/0040328 A1* | 2/2009 | Suzuki ........................ 348/222.1 |
| 2011/0234867 A1* | 9/2011 | Sato et al. ..................... 348/294 |
| 2012/0147210 A1* | 6/2012 | Miyashita et al. .......... 348/223.1 |
| 2013/0027592 A1* | 1/2013 | Sugiura et al. ................ 348/243 |

FOREIGN PATENT DOCUMENTS

JP 2006-135726 5/2006

* cited by examiner

*Primary Examiner* — Dennis Hogue
(74) *Attorney, Agent, or Firm* — Oblon, Spivak, McClelland, Maier & Neustadt, L.L.P.

(57) ABSTRACT

According to one embodiment, there is provided an analog gain range determining unit that determines a range to which an analog gain setting an amplification factor of a pixel signal read from a pixel belongs, a clamp parameter control condition setting unit that sets a control condition of a clamp parameter setting the black level based on a result of the determination by the analog gain range determining unit, and a clamp parameter control unit that controls the clamp parameter based on the control condition set by the clamp parameter control condition setting unit.

9 Claims, 4 Drawing Sheets

FIG.4

LOW GAIN ↑

| DIVISION OF REFERENCE VOLTAGE CONTROL RANGE | RANGE#4 | PRESET COEFFICIENT FOR NORMAL OPERATION_RNG4 | PRESET COEFFICIENT FOR LONG LIGHT EXPOSURE |
| | RANGE#3 | PRESET COEFFICIENT FOR NORMAL OPERATION_RNG3 | |
| | RANGE#2 | PRESET COEFFICIENT FOR NORMAL OPERATION_RNG2 | |
| | RANGE#1 | PRESET COEFFICIENT FOR NORMAL OPERATION_RNG1 | |

HIGH GAIN ↓

FIG.5

LOW GAIN ↑

| DIVISION OF REFERENCE VOLTAGE CONTROL RANGE | RANGE#4 | CLAMP PARAMETER CHANGE AMOUNT COEFFICIENT_RNH4 |
| | RANGE#3 | CLAMP PARAMETER CHANGE AMOUNT COEFFICIENT_RNH3 |
| | RANGE#2 | CLAMP PARAMETER CHANGE AMOUNT COEFFICIENT_RNH2 |
| | RANGE#1 | CLAMP PARAMETER CHANGE AMOUNT COEFFICIENT_RNH1 |

HIGH GAIN ↓

BLACK LEVEL ADJUSTMENT CONTROL DEVICE AND SOLID-STATE IMAGING DEVICE

CROSS-REFERENCE TO RELATED APPLICATIONS

This application is based upon and claims the benefit of priority from Japanese Patent Application No. 2011-163476, filed on Jul. 26, 2011; the entire contents of which are incorporated herein by reference.

FIELD

Embodiments described herein relate generally to a black level adjustment control device and a solid-state imaging device.

BACKGROUND

In a solid-state imaging device, an optical black (OB) pixel may be provided to set a black level standard when photographing an image. In the OB pixel, a dark voltage changes depending on a usage condition such as a high temperature or a high sensitivity, and a black level read from the OB pixel varies. In order to compensate for the variation of the black level, a feedback control is performed on a clamping voltage during an analog to digital (AD) conversion of a pixel signal until the black level read from the OB pixel converges to a target value.

BRIEF DESCRIPTION OF THE DRAWINGS

FIG. 4 is a diagram illustrating a method of setting a preset coefficient in response to the division of the analog gain range of FIG. 3;

FIG. 5 is a diagram illustrating a method of setting an amount of change of a clamp parameter in response to the division of the analog gain range of FIG. 3.

DETAILED DESCRIPTION

In general, according to an embodiment, a black level adjustment control device includes an analog gain range determining unit, a clamp parameter control condition setting unit, and a clamp parameter control unit. The analog gain range determining unit determines a range to which an analog gain that sets an amplification factor of a pixel signal read from a pixel belongs. The clamp parameter control condition setting unit sets the control condition of a clamp parameter that sets a black level based on a result of the determination by the analog gain range determining unit. The clamp parameter control unit controls the clamp parameter based on the control condition set by the clamp parameter control condition setting unit.

Exemplary embodiments of a solid-state imaging device will be explained below in detail with reference to the accompanying drawings. The present invention is not limited to the following embodiments.

(Embodiment 1)

Figure 1:
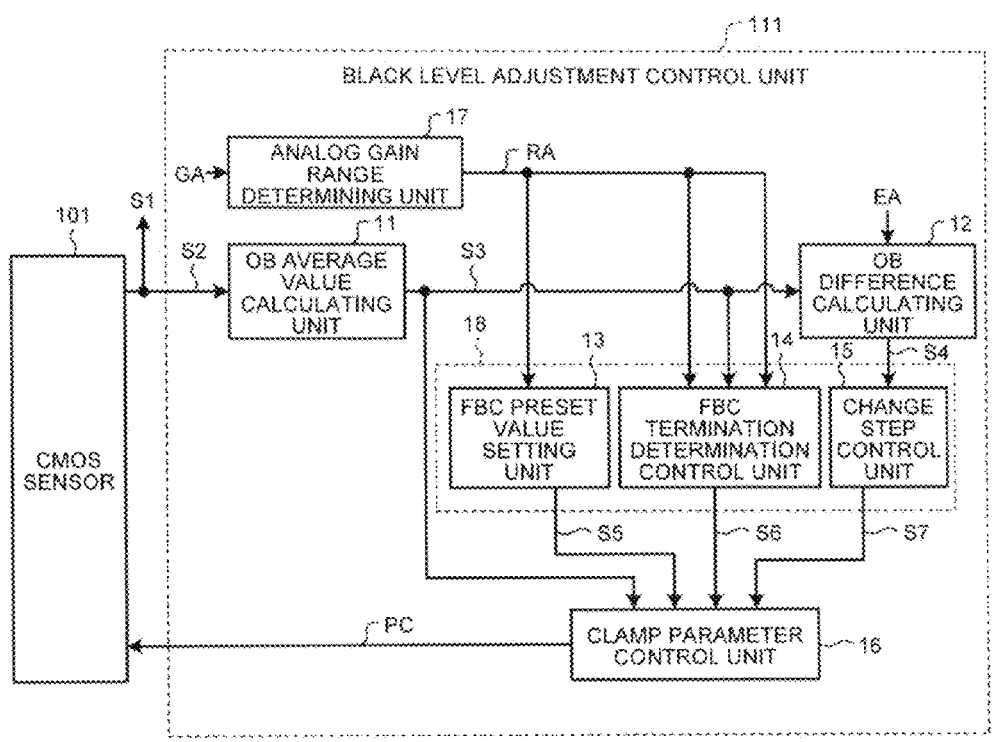
FIG. 1 is a block diagram illustrating a schematic configuration of a solid-state imaging device according to an embodiment.

FIG. 1 is a block diagram illustrating a schematic configuration of a solid-state imaging device according to an embodiment.

Referring to FIG. 1, the solid-state imaging device includes a complementary metal-oxide semiconductor (CMOS) sensor 101 that outputs an image signal S1 and a black level adjustment control unit 111 that performs a feedback control so that a black level read from an optical black (OB) pixel of the CMOS sensor 101 satisfies a predetermined condition. In this instance, for example, a Bayer array may be used as a filter array of the CMOS sensor 101, and a RAW image signal may be given as the image signal S1.

The black level adjustment control unit 111 may increase or decrease a clamp parameter PC so that the black level read from the OB pixel of the CMOS sensor 101 satisfies the predetermined condition. Here, the black level adjustment control unit 111 includes an OB average value calculating unit 11, an OB difference calculating unit 12, a clamp parameter control unit 16, an analog gain range determining unit 17, and a clamp parameter control condition setting unit 18.

The OB average value calculating unit 11 may calculate an average value of the black level read from the OB pixel. The OB difference calculating unit 12 may calculate a difference value between a target value and the average value of the black level read from the OB pixel. The analog gain range determining unit 17 may determine a range to which an analog gain that sets an amplification factor of a pixel signal read from a pixel of the CMOS sensor 101 belongs. The clamp parameter control condition setting unit 18 may set a control condition of the clamp parameter PC that sets a black level based on a result of the determination by the analog gain range determining unit 17. The clamp parameter control unit 16 may control the clamp parameter PC based on the control condition set by the clamp parameter control condition setting unit 18.

The clamp parameter control condition setting unit 18 includes an FBC preset value setting unit 13, an FBC termination determination control unit 14, and a change step control unit 15.

The FBC preset value setting unit 13 may set a preset value of the clamp parameter PC based on a result of the determination by the analog gain range determining unit 17. Further, the preset value of the clamp parameter PC is an initial value of the clamp parameter PC. The FBC termination determination control unit 14 may determine a termination of a black level adjustment based on the result of the determination by the analog gain range determining unit 17, and based on the average value of the black level read from the OB pixel. The change step control unit 15 may set an amount of change of the clamp parameter PC based on the result of the determination by the analog gain range determining unit 17, and based on the difference value between the target value and the average value of the black level read from the OB pixel.

Then, an incident light from a subject is photoelectric-converted in the CMOS sensor 101. Then, the image signal S1 generated in the CMOS sensor 101 is output to an OB clamp circuit 103. Further, an OB signal S2 read from the OB pixel of the CMOS sensor 101 is output to the black level adjustment control unit 111.

Then, in the OB average value calculating unit 11, the OB signal S2 of each OB pixel is added for each one horizontal line, the added value is divided by the number of additions and thus, an average value S3 of the black level read from the OB pixel is calculated. The average value S3 is output to the OB difference calculating unit 12, the FBC preset value setting unit 13, and the FBC termination determination control unit 14. Then, in the OB difference calculating unit 12, a difference value S4 between a target value EA and the average value S3 of the black level read from the OB pixel is calculated. The difference value S4 is output to the change step control unit 15.

On the other hand, in the analog gain range determining unit 17, a range corresponding to a magnitude of an analog gain GA is set. Then, in the analog gain range determining unit 17, a range in which a current analog gain GA is included is determined, and analog gain range information RA is output to the FBC preset value setting unit 13, the FBC termination determination control unit 14, and the change step control unit 15.

Then, in the FBC preset value setting unit 13, a preset value S5 of the clamp parameter PC is set based on the analog gain range information RA, and the preset value S5 is output to the clamp parameter control unit 16.

Further, in the FBC termination determination control unit 14, an FBC execution flag S6 is set so that the average value S3 of the black level falls in a predetermined range corresponding to the analog gain range information RA. The FBC execution flag S6 is output to the clamp parameter control unit 16.

Further, in the change step control unit 15, a change amount S7 of the clamp parameter PC is set based on the difference value S4 and the analog gain range information RA. The change amount S7 is output to the clamp parameter control unit 16.

Then, in the clamp parameter control unit 16, the preset value S5 is set to the initial value of the clamp parameter PC when the FBC execution flag S6 is set, and the clamp parameter PC is increased and decreased in response to a change amount S7 of the clamp parameter PC. The clamp parameter PC is output to the CMOS sensor 101.

Accordingly, in response to a magnitude of the analog gain GA, the initial value of the clamp parameter PC may be changed, an amount of change of the clamp parameter PC may be changed, and a black level adjustment termination condition may be eased. Thus, under a usage condition of a high temperature, a high sensitivity, and a long light exposure, even when the black level read from the OB pixel of the CMOS sensor 101 greatly increases, and the black level read from the OB pixel greatly varies, an increase of time until the black level read from the OB pixel converges to a target value may be suppressed, and a hunting may be prevented.

Figure 2:
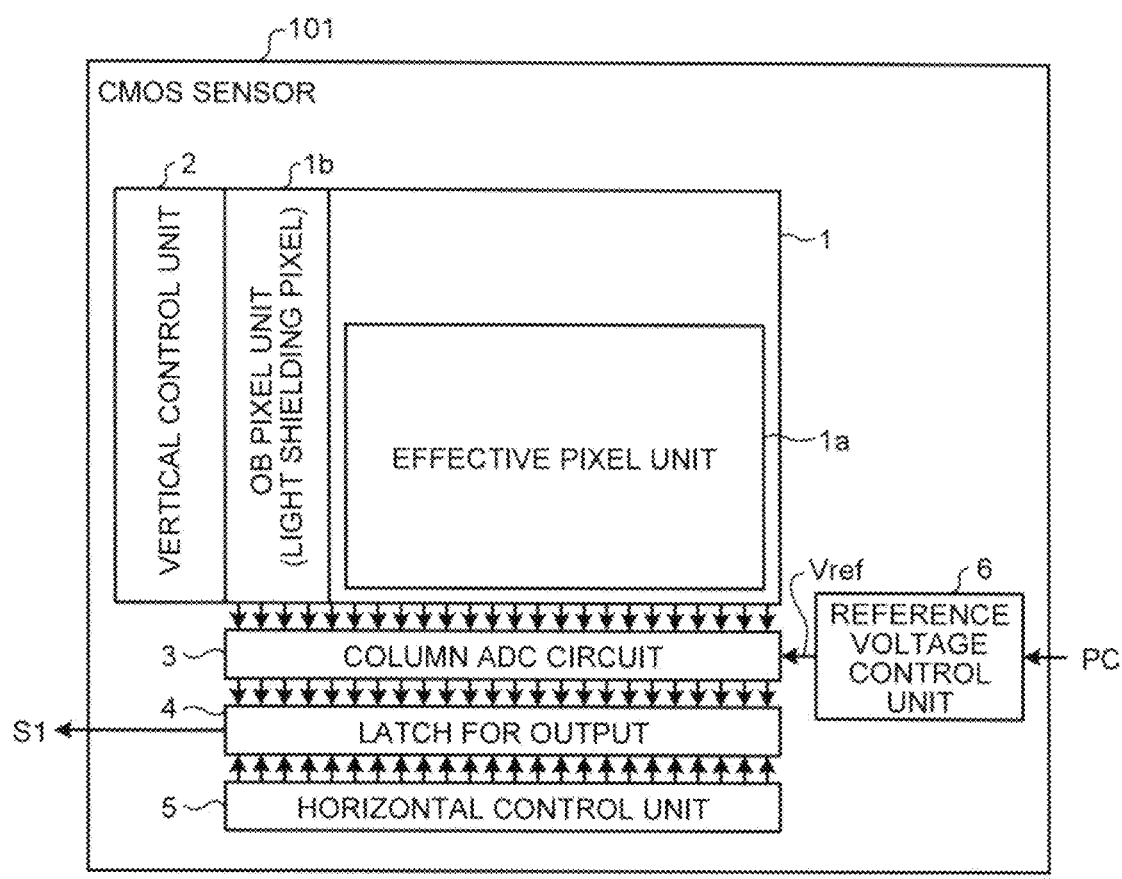
FIG. 2 is a block diagram illustrating a schematic configuration of a complementary metal-oxide semiconductor (CMOS) sensor of FIG. 1.

FIG. 2 is a block diagram illustrating a schematic configuration of a CMOS sensor of FIG. 1.

Referring to FIG. 2, a CMOS sensor 101 includes a pixel array unit 1 in which pixels are disposed in a matrix form in a row direction and a column direction. Here, the pixel array unit 1 includes an effective pixel unit 1a in which effective pixels are disposed in a matrix form in the row direction and the column direction, and an OB pixel unit 1b in which light shielding pixels (OB pixels) are disposed around the effective pixel unit 1a.

Further, the CMOS sensor 101 includes a vertical control unit 2 that scans the pixel array unit 1 in a vertical direction, a column ADC circuit 3 that digitizes, by a CDS, a signal component read from the pixel array unit 1 based on a result of comparison with a reference voltage Vref, a latch for output 4 that holds the signal component digitized by the column ADC circuit 3 for one horizontal line, a horizontal control unit 5 that scans the pixel array unit 1 in a horizontal direction, and a reference voltage control unit 6 that controls the reference voltage Vref based on a clamp parameter PC. In addition, the clamp parameter PC may set a clamp level of the reference voltage Vref. The reference voltage Vref may use a lamp wave.

A pixel of the pixel array unit 1 is scanned in the vertical direction by the vertical control unit 2 and thus, a signal is read from the pixel of the pixel array unit 1, and is transferred to the column ADC circuit 3. Then, in the column ADC circuit 3, the signal component read from the pixel array unit 1 is analog-to-digital converted by the CDS, and a converted result is hold in the latch for output 4. By being scanned in the horizontal direction using the horizontal control unit 5, an image signal S1 is output via the latch for output 4.

In this instance, in a black level adjustment control unit 110, the clamp parameter PC may be set so that a dark current of an OB pixel is offset by a clamp level of the reference voltage Vref during an AD conversion performed by the column ADC circuit 3.

Figure 3:
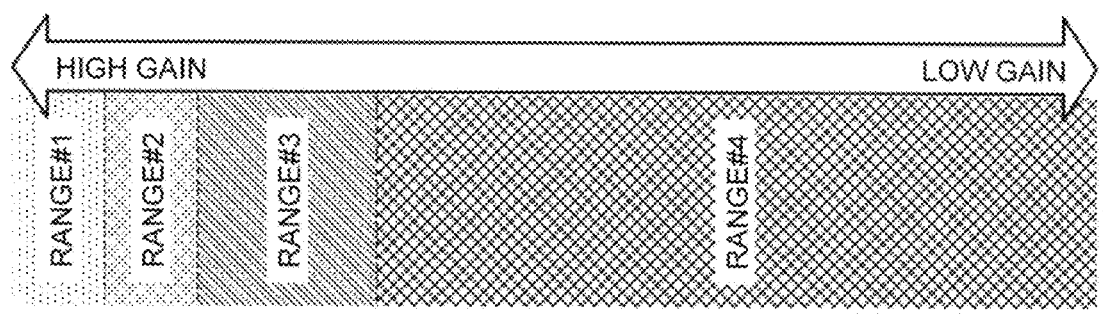
FIG. 3 is a diagram illustrating a method of dividing an analog gain range in a black level adjustment control unit of FIG. 1.

FIG. 3 is a diagram illustrating a method of dividing an analog gain range in a black level adjustment control unit of FIG. 1.

Referring to FIG. 3, for example, a range of an analog gain GA may be set to four ranges of RANGE #1 to RANGE #4. Here, the number of divided ranges of the analog gain GA is not limited to four. A width of each range may be arbitrary set. For example, in order to minutely adjust a coefficient on a high gain side that is greatly affected by an increase of a dark current in a long light exposure or high temperature environment, a range width on a high gain side may be narrower than a range width on a low gain side. Specifically, for example, the range may be set to RANGE #1 when the analog gain GA corresponds to a value between "0" and "15", to RANGE #2 when the analog gain GA corresponds to a value between "16" and "31", to RANGE #3 when the analog gain GA corresponds to a value between "32" and "63", and to RANGE #4 when the analog gain GA corresponds to a value of 64.

Then, the analog gain range determining unit 17 of FIG. 1 may output "0" as analog gain information RA when the analog gain GA belongs to RANGE #1, output "1" as the analog gain information RA when the analog gain GA belongs to RANGE #2, output "2" as the analog gain information RA when the analog gain GA belongs to RANGE #3, and output "4" as the analog gain information RA when the analog gain GA belongs to RANGE #4.

FIG. 4 is a diagram illustrating a method of setting a preset coefficient in response to a division of an analog gain range of FIG. 3.

Referring to FIG. 4, an FBC preset value setting unit 13 of FIG. 1 may include, as a preset value S5, a preset coefficient for a normal operation and a preset coefficient for a long light exposure. The preset coefficient for a normal operation may be set to each of preset coefficients for a normal operation RNG1 to RNG4 in response to the ranges RANGE #1 to RANGE #4 of the analog gain GA. The preset coefficient for a long light exposure may be set to a fixed value independently of the ranges RANGE #1 to RANGE #4 of the analog gain GA.

Then, during a normal operation, the FBC preset value setting unit 13 may select each of the preset coefficients for a normal operation RNG1 to RNG4 in response to the ranges RANGE #1 to RANGE #4 of the analog gain GA, and output each of the preset coefficients as the preset value S5. During a long light exposure, the preset coefficient for a long light exposure may be selected and output, as the preset value S5, to a clamp parameter control unit 16.

For example, the preset coefficient for a normal operation may be great in a case where the analog gain GA is high when compare to a case where the analog gain GA is low. A dark current of an OB pixel increases in a case where the analog gain GA is high when compare to a case where the analog gain GA is low and thus, an average value S3 of a black level read from the OB pixel increases. By increasing the preset coefficient for a normal operation in a case where the analog gain GA is high when compare to a case where the analog gain GA is low, an initial value of a clamp parameter PC may be set so that an increased amount of the average value S3 of the black level is compensated for, and a black level adjustment control may easily converge.

FIG. 5 is a diagram illustrating a method of setting an amount of change of a clamp parameter in response to a division of an analog gain range of FIG. 3.

Referring to FIG. 5, in a change step control unit 15 of FIG. 1, each of clamp parameter change amount coefficients RNH1 to RNH4 may be set in response to ranges RANGE #1 to RANGE #4 of the analog gain GA.

Then, the change step control unit 15 may select each of the clamp parameter change amount coefficients RNH1 to RNH4 for each one horizontal period in response to the ranges RANGE #1 to RANGE #4 of the analog gain GA. By multiplying a difference value S4 by the selected clamp parameter change amount coefficients RNH1 to RNH4, a change amount S7 of a clamp parameter PC may be calculated, and the change amount S7 may be output to a clamp parameter control unit 16.

For example, a clamp parameter change amount coefficient may be increased in a case where the analog gain GA is high when compared to a case where the analog gain GA is low. A dark current of an OB pixel increases in a case where the analog gain GA is high when compared to a case where the analog gain GA is low and thus, an average value S3 of a black level read from the OB pixel increases. Therefore, by increasing the clamp parameter change amount coefficient in a case where the analog gain GA is high when compared to a case where the analog gain GA is low, the change amount S7 of the clamp parameter PC may be increased in response to an increased amount of the average value S3 of the black level, and a black level adjustment control may easily converge.

Figure 6:
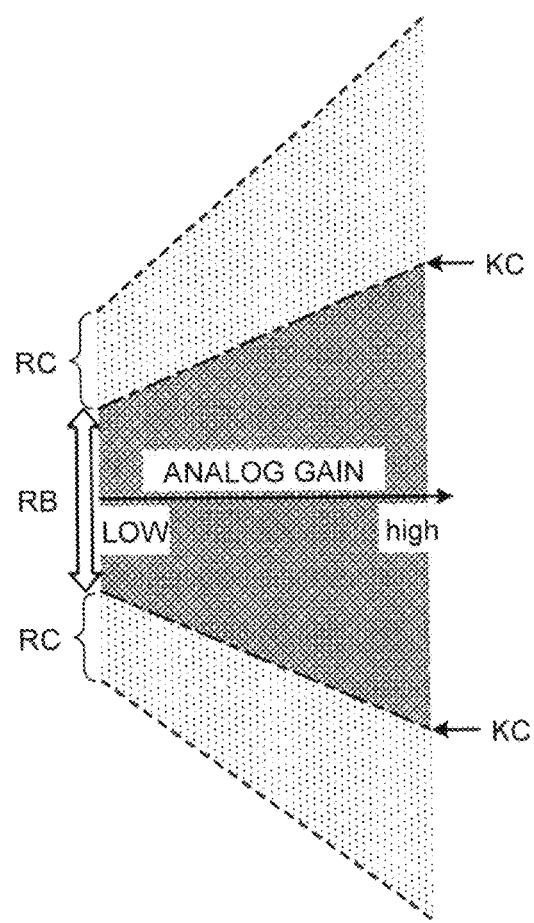
FIG. 6 is a diagram illustrating a method of setting a black level adjustment termination condition range in response to a magnitude of an analog gain.

FIG. 6 is a diagram illustrating a method of setting a black level adjustment termination condition range in response to a magnitude of an analog gain.

Referring to FIG. 6, in an FBC termination determination control unit 14, a black level adjustment termination condition range RB is set, and a black level adjustment operation range RC is set on an outside of the black level adjustment termination condition range RB. In this instance, an FBC conversion holding range boundary KC is set on a boundary between the black level adjustment termination condition range RB and the black level adjustment operation range RC.

Then, in the FBC termination determination control unit 14, when an average value S3 of a black level is outside the black level adjustment termination condition range RB, an FBC execution flag S6 is set and output to a clamp parameter control unit 16. On the other hand, when the average value S3 of the black level is inside the black level adjustment termination condition range RB, a setting of the FBC execution flag S6 is cancelled.

Here, in the FBC termination determination control unit 14, the FBC conversion holding range boundary KC is moved in response to an analog gain GA and thus, the black level adjustment termination condition range RB is enlarged and reduced. For example, when the analog gain GA is high, a change of the average value S3 of the black level increases by noise due to a dark current and thus, a black level adjustment control is difficult to converge. Therefore, when the analog gain GA is high, by enlarging the black level adjustment termination condition range RB, the black level adjustment control may easily converge. On the other hand, when the analog gain GA is low, by reducing the black level adjustment termination condition range RB, a degree of precision of calibration of the black level may be increased, and a high definition may be achieved.

An example of FIG. 3 describes a method of inputting analog gain range information RA to the FBC termination determination control unit 14 so as to enlarge and reduce the black level adjustment termination condition range RB in response to the analog gain GA. However, the analog gain GA itself may be input to the FBC termination determination control unit 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising:
   a complementary metal-oxide semiconductor (CMOS) sensor that outputs an image signal; and
   a black level adjustment control unit that adjusts a black level of the image signal read from the CMOS sensor,
   wherein the CMOS sensor includes:
      an effective pixel unit in which an effective pixel is arranged;
      an optical black (OB) pixel unit in which an OB pixel is arranged;
      a column analog to digital converter (ADC) circuit that digitizes a signal component read from the effective pixel based on a result of comparison with a reference voltage; and
      a reference voltage control unit that controls the reference voltage,
   wherein the black level adjustment control unit enlarges or reduces a clamp parameter that sets the black level based on a result of determining a range to which an analog gain setting an amplification factor of a pixel signal read from the effective pixel belongs,
   wherein the black level adjustment control unit includes:
   an analog gain range determining unit that determines a range to which the analog gain belongs;
   a clamp parameter control condition setting unit that sets a control condition of the clamp parameter based on a result of the determination by the analog gain range determining unit; and
   a clamp parameter control unit that controls the clamp parameter based on the control condition set by the clamp parameter control condition setting unit,
   wherein the clamp parameter control condition setting unit includes a feedback clamp (FBC) preset value setting unit that sets a preset value of the clamp parameter based on the result of the determination by the analog gain range determining unit, and
   wherein the preset value includes a preset coefficient for a normal operation and a preset coefficient for a long light exposure, the preset coefficient for a normal operation is set in response to a range of the analog gain, and the preset coefficient for a long light exposure is set to a fixed value independently of the range of the analog gain.

2. The solid-state imaging device according to claim 1, wherein the preset coefficient for a normal operation is greater in a case where the analog gain is high when compared to a case where the analog gain is low.

3. The solid-state imaging device according to claim 1, wherein the clamp parameter control condition setting unit includes a change step control unit that sets an amount of change of the clamp parameter based on the result of the determination by the analog gain range determining unit.

4. A solid-state imaging device, comprising:
   a complementary metal-oxide semiconductor (CMOS) sensor that outputs an image signal; and
   a black level adjustment control unit that adjusts a black level of the image signal read from the CMOS sensor,
   wherein the CMOS sensor includes:
      an effective pixel unit in which an effective pixel is arranged;
      an optical black (OB) pixel unit in which an OB pixel is arranged;
      a column analog to digital converter (ADC) circuit that digitizes a signal component read from the effective pixel based on a result of comparison with a reference voltage; and
      a reference voltage control unit that controls the reference voltage,
   wherein the black level adjustment control unit enlarges or reduces a clamp parameter that sets the black level based on a result of determining a range to which an analog gain setting an amplification factor of a pixel signal read from the effective pixel belongs,
   wherein the black level adjustment control unit includes:
      an analog gain range determining unit that determines a range to which the analog gain belongs;
      a clamp parameter control condition setting unit that sets a control condition of the clamp parameter based on a result of the determination by the analog gain range determining unit; and
      a clamp parameter control unit that controls the clamp parameter based on the control condition set by the clamp parameter control condition setting unit, and
   wherein the clamp parameter control condition setting unit includes a feedback clamp (FBC) termination determination control unit that determines a termination of a black level adjustment based on the result of the determination by the analog gain range determining unit.

5. The solid-state imaging device according to claim 4, wherein:
   the FBC termination determination control unit sets an FBC execution flag such that an average value of the black level falls in a predetermined range corresponding to analog gain range information, and
   the clamp parameter control unit increases or decreases the clamp parameter in response to an amount of change of the clamp parameter when the FBC execution flag is set.

6. The solid-state imaging device according to claim 5, wherein the FBC termination determination control unit sets a black level adjustment operation range on an outside of a black level adjustment termination condition range, sets the FBC execution flag when the average value of the black level is outside the black level adjustment termination condition range, and cancels the setting of the FBC execution flag when the average value of the black level falls in the black level adjustment termination condition range.

7. The solid-state imaging device according to claim 5, wherein the FBC termination determination control unit enlarges or reduces the black level adjustment termination condition range in response to the analog gain.

8. The solid-state imaging device according to claim 5, wherein the FBC termination determination control unit enlarges the black level adjustment termination condition range in a case where the analog gain is high when compared to a case where the analog gain is low.

9. The solid-state imaging device according to claim 4, wherein the clamp parameter control condition setting unit includes a change step control unit that sets an amount of change of the clamp parameter based on the result of the determination by the analog gain range determining unit.

\* \* \* \* \*